(12) United States Patent
Dubas et al.

(10) Patent No.: US 6,460,424 B1
(45) Date of Patent: Oct. 8, 2002

(54) COMBINED VERTICAL AND ROTATIONAL MOTION INDEXING MECHANISM

(75) Inventors: Stephan T. Dubas; Joseph B. Schlenoff, both of Tallahassee, FL (US)

(73) Assignee: Florida State University Research Foundation, Tallahassee, FL (US)

( * ) Notice: Subject to any disclaimer, the term of this patent is extended or adjusted under 35 U.S.C. 154(b) by 0 days.

(21) Appl. No.: 09/818,478

(22) Filed: Mar. 27, 2001

(51) Int. Cl.[7] ............................................... F16H 21/00
(52) U.S. Cl. ..................................... 74/22 R; 74/813 R
(58) Field of Search ............................... 74/816, 813 R, 74/813 C, 813 L, 817, 567, 821, 22 R (56) References Cited

U.S. PATENT DOCUMENTS

| | | | | |
|---|---|---|---|---|
| 3,965,775 A | * | 6/1976 | Pinkesfeld | 74/813 R |
| 4,189,963 A | * | 2/1980 | Sano et al. | 74/813 C |
| 4,630,493 A | * | 12/1986 | Kato | 74/22 R |
| 5,254,205 A | * | 10/1993 | Tsutsumi et al. | 134/66 |

* cited by examiner

Primary Examiner—Pam Rodriguez
Assistant Examiner—Melanie Torres
(74) Attorney, Agent, or Firm—John Wiley Horton (57) ABSTRACT

A mechanical indexing device. The device comprises a mechanism for converting linear motion into many different combinations of linear and rotary motion, whereby an object can be moved along a desired linear path and indexed through a desired arc of rotation.

6 Claims, 14 Drawing Sheets

COMBINED VERTICAL AND ROTATIONAL MOTION INDEXING MECHANISM

BACKGROUND OF THE INVENTION

Field of the Invention

This invention relates to the field of mechanisms. More specifically, the invention comprises a mechanism for converting linear motion into a combination of linear and rotary motion, whereby an object can be moved along a desired linear path and indexed through a desired arc of rotation. 2. Description of the Related Art Numerous prior art devices are designed to convert rotary motion into linear motion. U.S. Pat. No. 1,016,611 to Chilton (1912) discloses a bottle filling and capping machine. This machine is comprised of a rotating carousel. A mechanism (see FIG. 10) converts the rotating motion into linear motion for the bottles. Thus, as the carousel turns, the bottles are moved up and down to the appropriate positions for the capping process.

A similar approach is taken in U.S. Pat. No. 2,517,592 to Nordquist (1950). A camming surface (designated as "68" in FIG. 1) is used to raise and lower jars as they move on a rotating carousel. U.S. Pat. No. 2,638,259 to Garrett (1953) uses a similar camming surface (see FIG. 1).

More camming surfaces capable of converting rotary motion to linear motion are disclosed in U.S. Pat. No. 3,139,914 to Bingham (1961) and U.S. Pat. No. 3,335,767 to Manas (1967). Like the Chilton, Nordquist, and Garrett devices, the Bingham and Manas devices convert the machine's primary rotary motion into a reciprocating linear motion. All these devices —Chilton, Nordquist, Garrett, Binghan, and Manas—convert continuous rotary motion into rotary motion with an added reciprocating linear motion. It is significant to note that the rotary motion is always present in these devices; i.e., they are incapable of producing a purely linear motion at any point.

A different approach is disclosed in U.S. Pat. No. 4,027,767 to Gluck (1977). The Gluck device uses a slotted cylinder with a following peg riding in the slot in order to produce reciprocating linear motion (See FIG. 1). The Gluck device also uses a 6 position indexing gear (element "17" in FIG. 3) to index a turntable ("19") through several set indexing points. Thus, the device (which is actually a combination of several mechanisms) is capable of indexing a turntable to a fixed position, moving it up and down, then indexing it to another position. In other words, it can have purely linear or rotary motion at a given point. Unfortunately, the Gluck device is rather complex—employing several mechanisms to achieve the desired linear and rotary motion.

Some devices are, of course, capable of converting a primarily linear motion into rotary motion One such device is disclosed in U.S. Pat. No. 5,806,404 to Sher (1998). The Sher device uses a reciprocating piston as the driving mechanism (such as found in a pneumatic driving system). A pair of pegs riding in a groove convert this reciprocating linear motion to a continuous rotary motion (see FIGS. 2, 3, and 5). The actual object being moved (a cutter head) simultaneously exhibits rotary and linear motion; i.e., the device is incapable of producing purely linear or rotary motion.

Accordingly, the prior art devices are limited in that they: (1) Are incapable of producing purely linear motion; and/or (2) Require a complex combination of several mechanisms to achieve linear motion without rotary motion.

BRIEF SUMMARY OF THE INVENTION

It is desirable to index a table through a fixed arc, and to then move the table up and down in a purely linear fashion. This type of motion is useful in many processes, particularly where one wishes to bring a polar array of objects into contact with another stationary object so that some operation can be performed.

Figure 1:
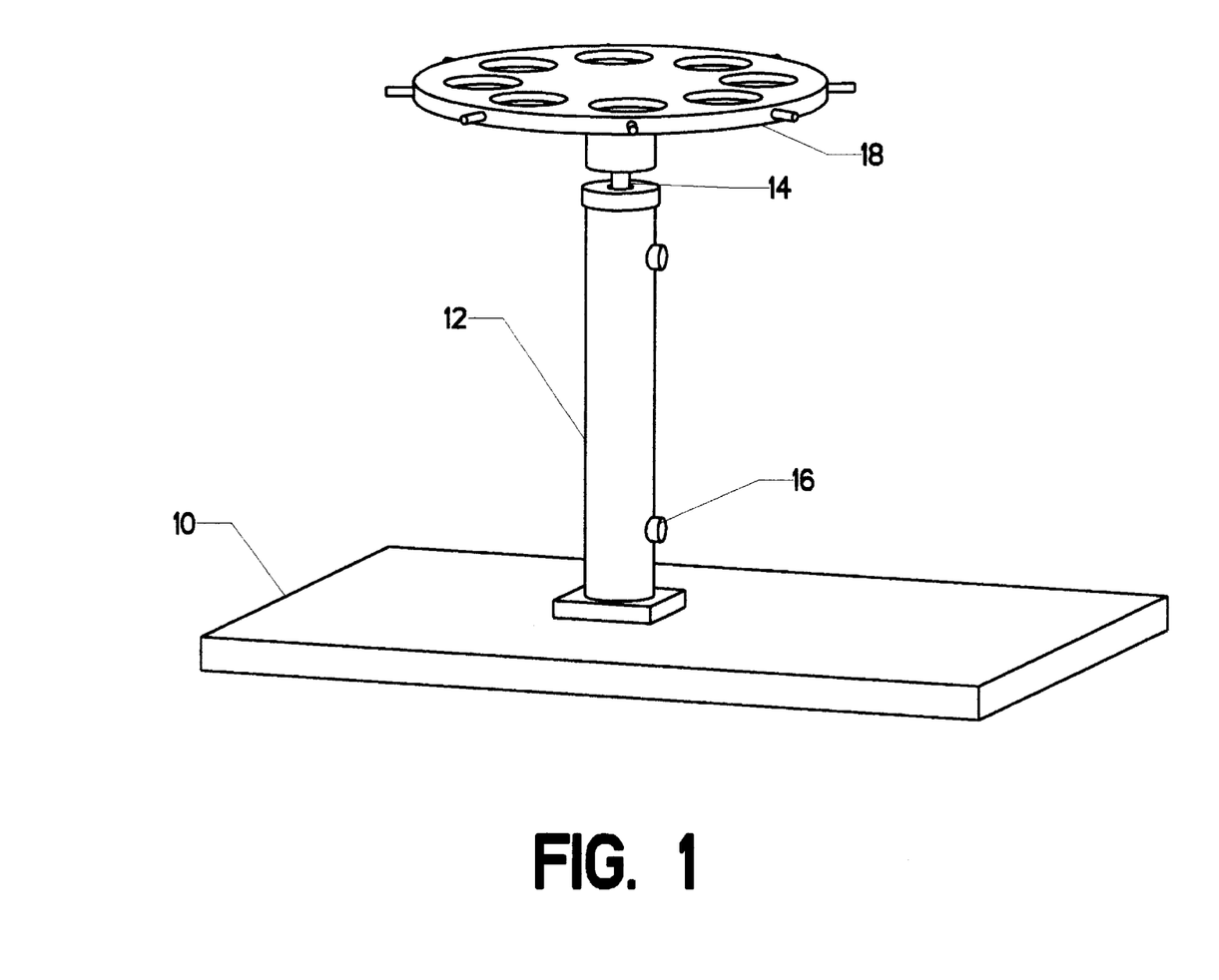
FIG. 1 is an isometric view, showing the proposed invention.

The present invention seeks to create this type of motion using only the reciprocating linear motion of an air cylinder as the driving force. Referring to FIG. 1, air cylinder 12 is affixed to base 10. Air cylinder 12 has cylinder rod 14, which moves up and down as air pressure is applied to port 16 (typically by an air hose—not shown). Table 18 is attached to the upper end of cylinder rod 14. FIG. 1 shows table 18 in its lowered position.

Figure 2:
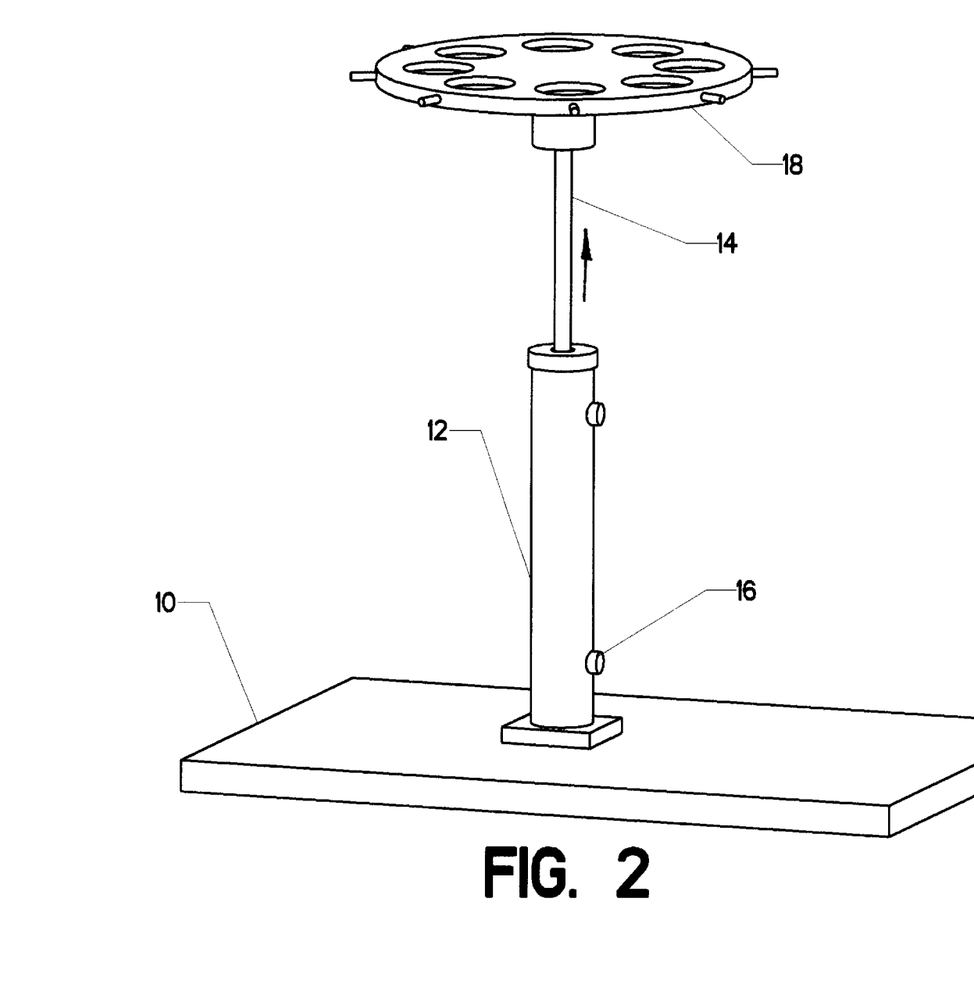
FIG. 2 is an isometric view, showing the table in its raised position.

Turning now to FIG. 2, air pressure has been applied to air cylinder 12, with the result that table 18 has been lifted to its upper position. This movement—between FIG. 1 and FIG. 2 constitutes the linear input motion which drives the device. To lower table 18, the air pressure is shut off to air cylinder 12. Gravity then pulls table 18 back down to its lowered position.

Figure 3:
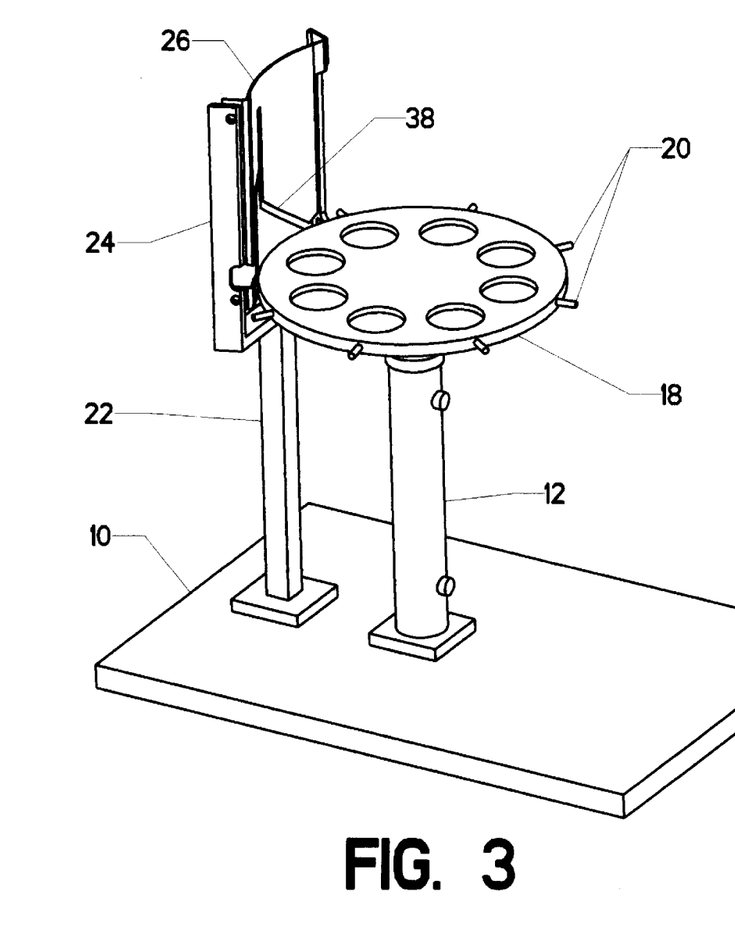
FIG. 3 is an isometric view, showing the indexer.

Turning to FIG. 3, the reader will observe that table 18 has several pegs 20 spaced evenly around its perimeter. Indexer 26 is positioned close by the perimeter of table 18. Indexer 26 has slot 38 cut completely through its thickness. Pegs 20 are sized to fit within slot 38. Slot 38 is designed to convert a portion of the aforementioned linear motion into an indexing rotary motion—as will be explained in more detail subsequently.

| REFERENCE NUMERALS IN THE DRAWINGS | | | |
|---|---|---|---|
| 10 | base | 12 | air cylinder |
| 14 | cylinder rod | 16 | port |
| 18 | table | 20 | peg |
| 22 | indexer stand | 24 | indexer bracket |
| 26 | indexer | 28 | sample stand |
| 30 | motor | 32 | sample |
| 34 | beaker | 36 | optional angled portion |
| 38 | slot | 40 | mounting point |
| 42 | start point | 44 | end point |
| 46 | second vertical portion | 48 | anti-reversing junction |
| 50 | first vertical portion | 52 | first angled portion |
| 54 | second angled portion | 56 | relief cut |

DESCRIPTION OF THE INVENTION

FIG. 1. depicts the most basic elements of the invention. Base 10 is a substantially rigid plate useful for mounting the other elements. Air cylinder 12 is attached to base 10. Cylinder rod 14 extends and retracts from air cylinder 12 as air pressure is applied through port 16. Air pressure is on conventionally applied through a flexible hose, which is not shown. Table 18 is affixed to the top cylinder rod 14. FIG. 1 shows cylinder rod 14 in its retracted position, which corresponds to table 18 being in its lowered position.

In FIG. 2, air pressure has been applied and cylinder rod 14 has extended upward—as indicated by the arrow. Table 18 is correspondingly raised to its upper position. Thus, the reader will appreciate that a conventional air cyslinder is used to produce purely vertical motion of an attached table.

FIG. 3 shows several additional elements. Indexer 26 is mounted near the circumference of table 18. Indexer 26 is attached to indexer bracket 24, which is held in place by indexer stand 22. Indexer stand 22 is attached to base 10.

The reader will observe that table 18 has a number of evenly spaced pegs 20 radiating outward from its circular perimeter. Indexer 26 has slot 38 cut into its side facing table 18. Slot 38 is sized to receive and guide a peg 20 as table 18 is moved between its lower and upper positions.

Figure 4:
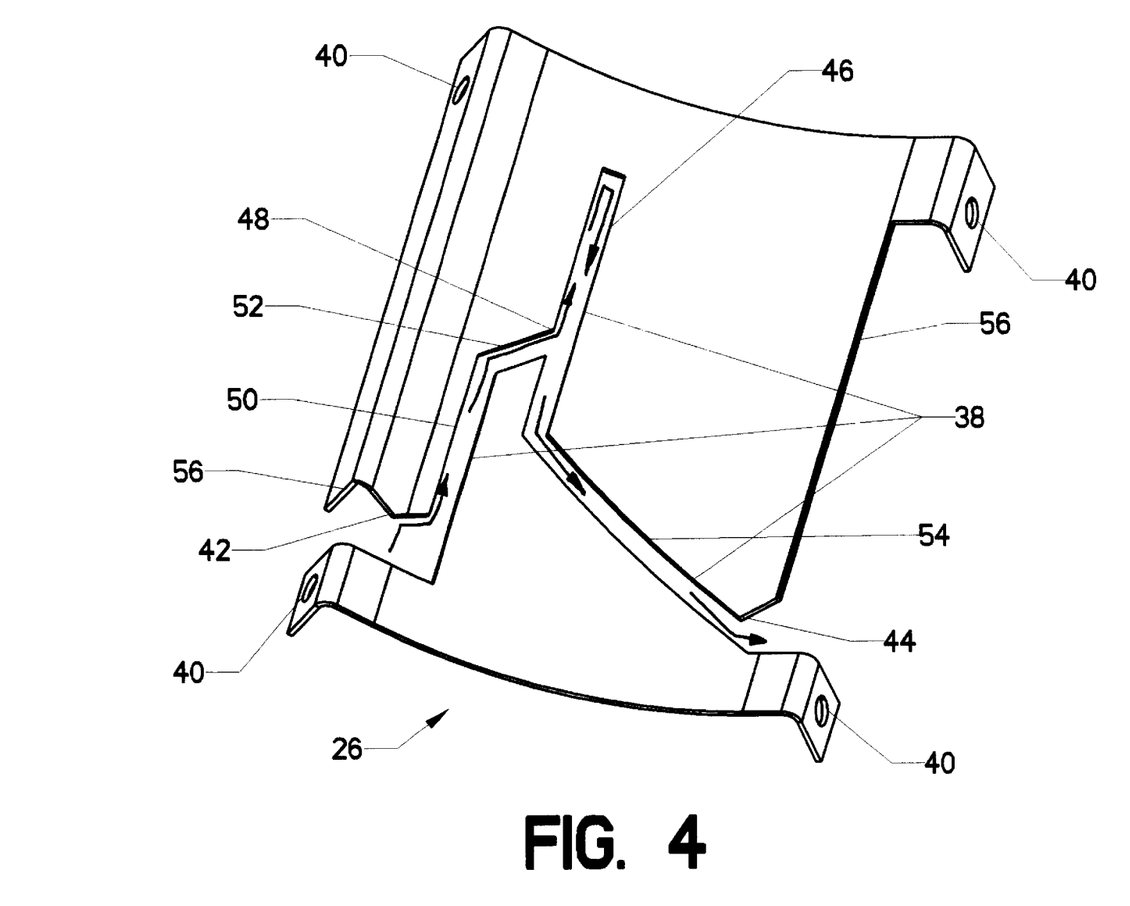
FIG. 4 is an isometric view, showing more details of the indexer.

FIG. 4 shows indexer 26 in more detail. The reader will observe that it has a curved shape, designed to fit closely against the circular perimeter of table 18. FIG. 4 is looking at the near side of indexer 26, which is the side facing table 18.

Slot 38 is comprised of several distinct portions. Start point 42 is the point where a particular peg 20 will first enter slot 38 (more detailed views describing the interaction of the slot and the pegs follow). Optional angled portion 36 is the first segment encountered. This segment is referred to as "optional" because it is not essential to the operation of the device. The remaining segments are first vertical portion 50, first angled portion second 52, vertical portion 46, and second angled portion 54. End point 44 is the point where a particular peg 20 will leave slot 38.

Four mounting points 40 are provided to mount indexer 26 to indexer mounting bracket 24. Relief cuts 56 are provided to allow a particular peg 20 to engage and disengage from indexer 26.

Figure 5:
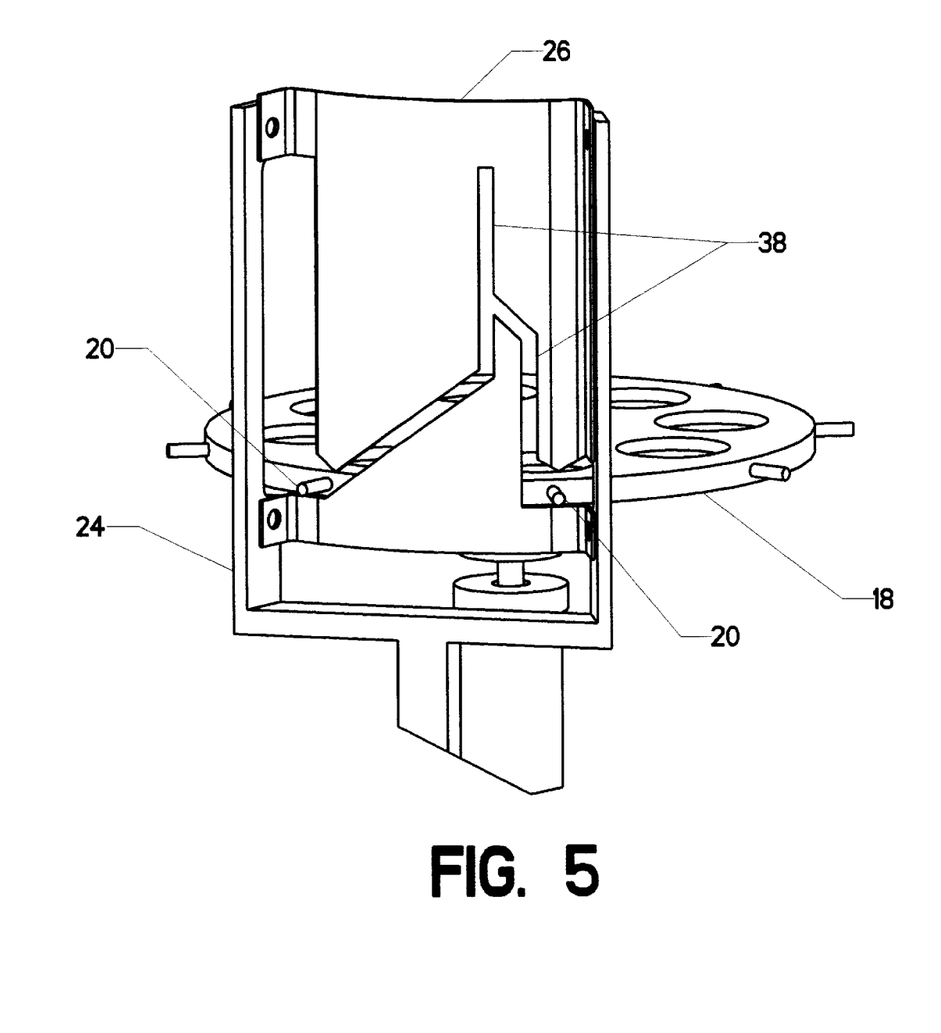
FIG. 5 is an isometric view, showing the table in its lowered position.

FIGS. 5 through 10 depict the interaction of a particular peg 20 with indexer 26, with continuous reference also being made to the details disclosed in FIG. 4. FIG. 5 shows table 18 in its lower position, which represents the start of an indexing cycle. The far side of indexer 26 is shown (opposite side from the one depicted in FIG. 4) The right-hand of the two labeled pegs 20 is poised to enter slot 38. Likewise, the left-hand peg 20 is poised to disengage from slot 38.

Figure 6:
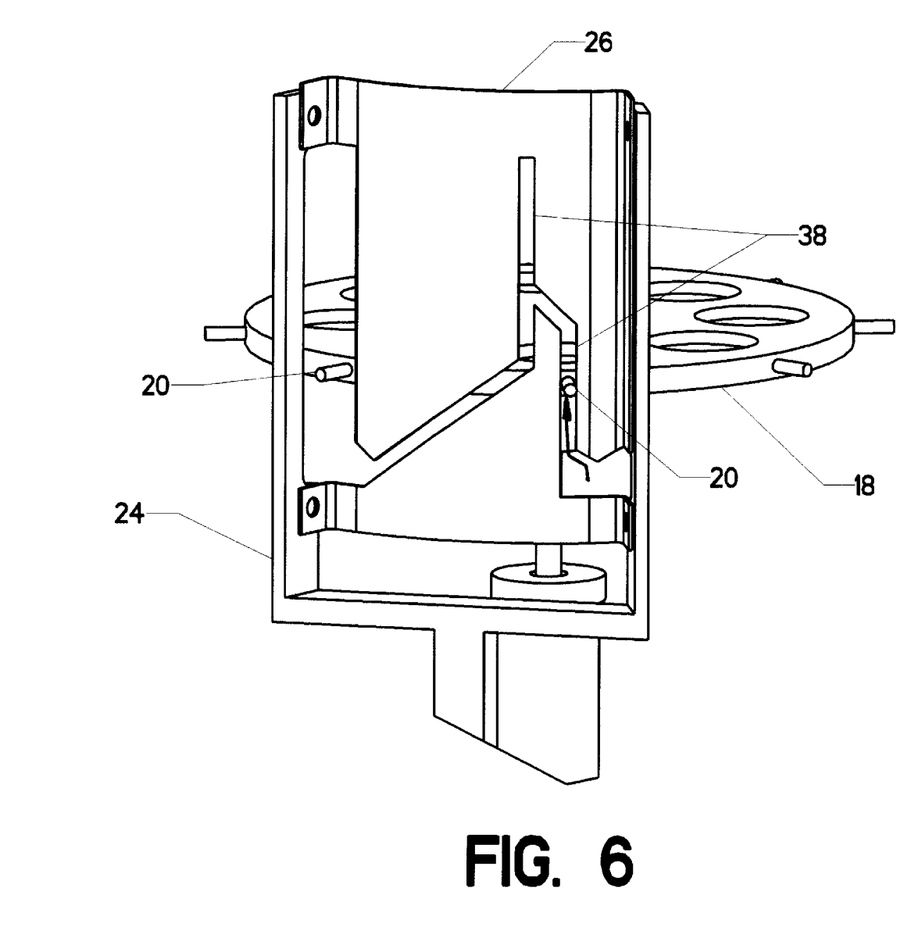
FIG. 6 is an isometric view, showing the table as it begins to rise, and its interaction with the indexer.

FIG. 6 shows table 18 as it has started to move upward. The reader will observe that the right-hand peg 20 has encountered optional angled portion 36 and has moved into first vertical portion 50. The result is that table 18 has rotated slightly clockwise (as viewed from above) as it rose, and then transitioned to purely vertical motion—as indicated by the arrow. The reader will observe that the left-hand peg 20 is completely disengaged.

Figure 7:
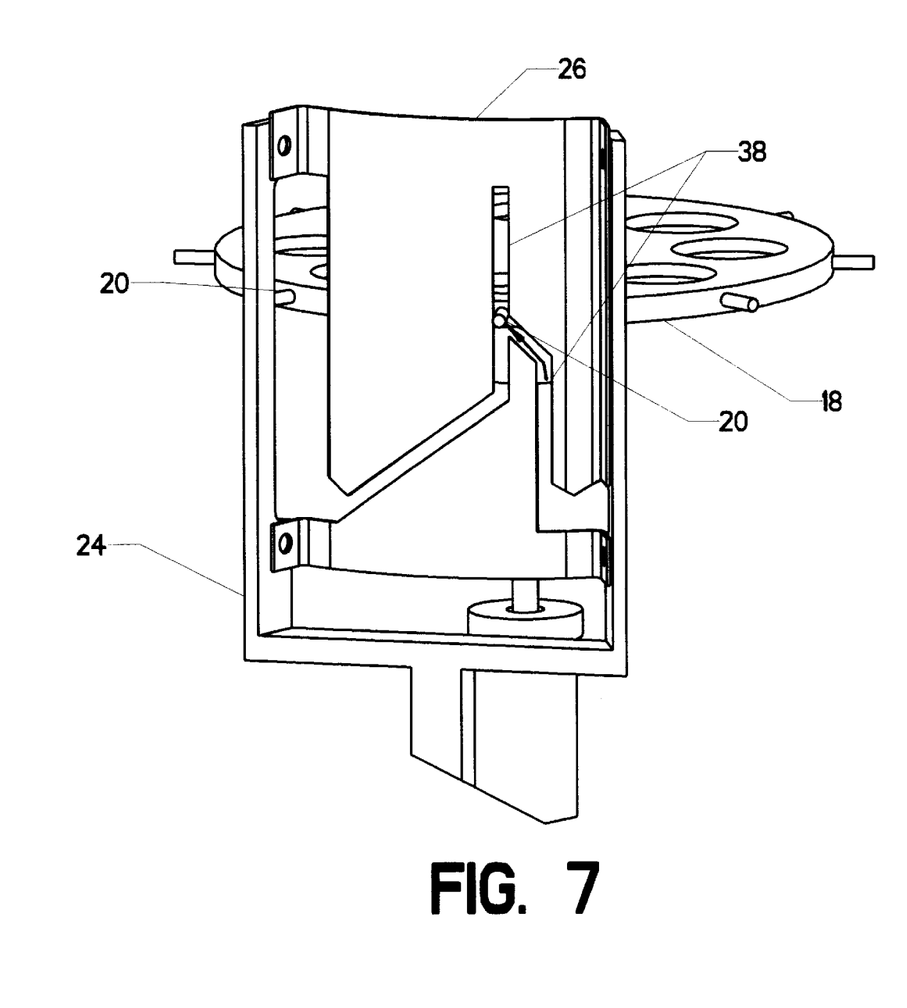
FIG. 7 is an isometric view, showing the table as it continues to rise, and its interaction with the indexer.

FIG. 7 shows table 18 as it has moved further upward. The right-hand peg 20 has moved through first angled portion 52. During that portion, table 18 rotated clockwise as it rose. As shown, the right-hand peg 20 has entered second vertical portion 46. Table 18 will only move vertically during tis phase because the right-hand peg 20 remains within second vertical portion 46.

Figure 8:
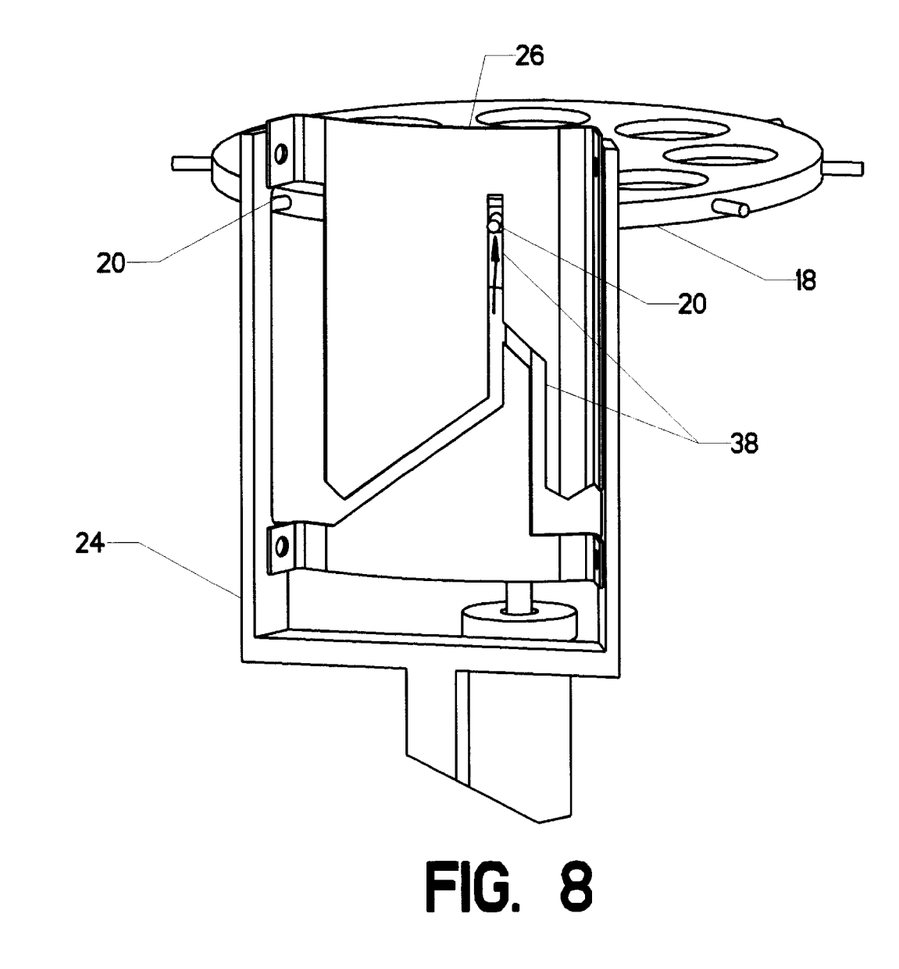
FIG. 8 is an isometric view, showing the table as it reaches its apex, and its interaction with the indexer.

FIG. 8 shows table 18 at the upper limit of its travel. Its motion is purely vertical. After the point shown in FIG. 8, the air pressure will be released from air cylinder 12 and gravity will pull table 18 downward. It is important for the reader to appreciate that the motion of table 18 is purely an up and down stroke near the top of its cycle. This motion is desirable for many operations—as will be explained subsequently.

As table 18 descends from the position shown in FIG. 8, the right-hand peg 20 will encounter anti-reversing junction 48. The design of this junction is obviously significant. First angled portion 52 intersects second vertical portion 46 a significant distance upward from the lower extreme of second vertical portion 46 (the upper extreme of first angled portion 52 is higher than the lower extreme of second vertical portion 46). The junction is designed to ensure that the right-hand peg 20 descends to the bottom of second vertical portion 46, rather than going back into first angled portion 52.

Figure 9:
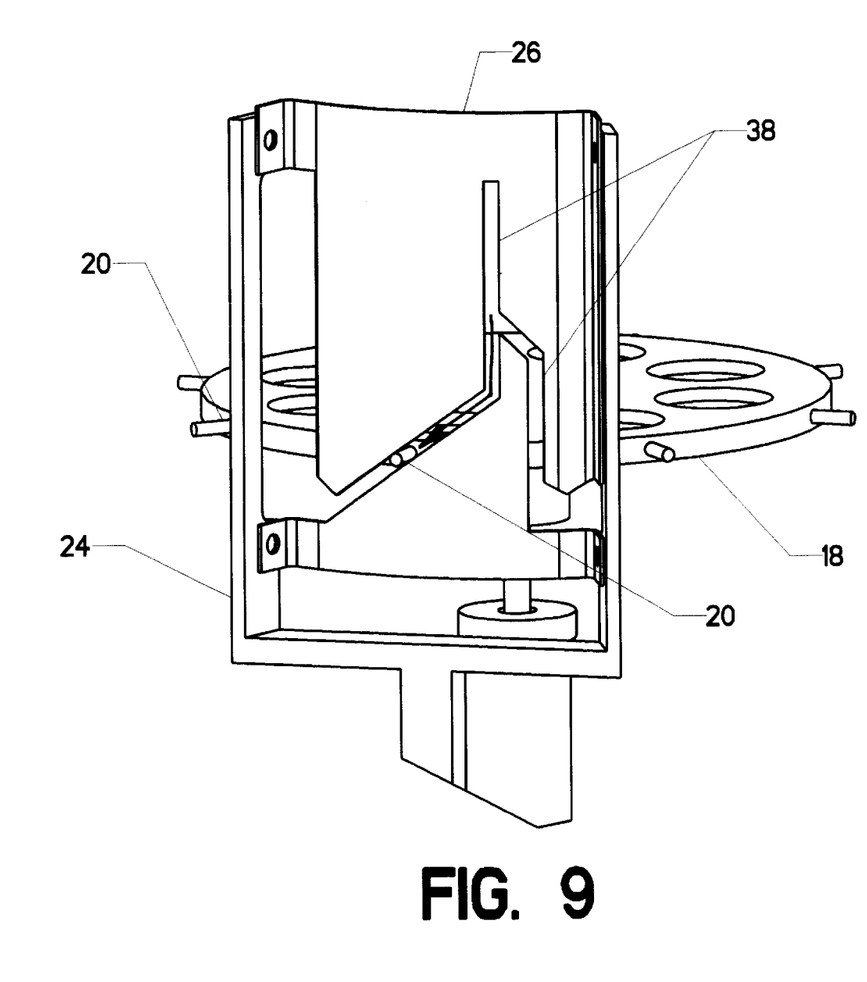
FIG. 9 is an isometric view, showing the table as it falls, and its interaction with the indexer.
Figure 10:
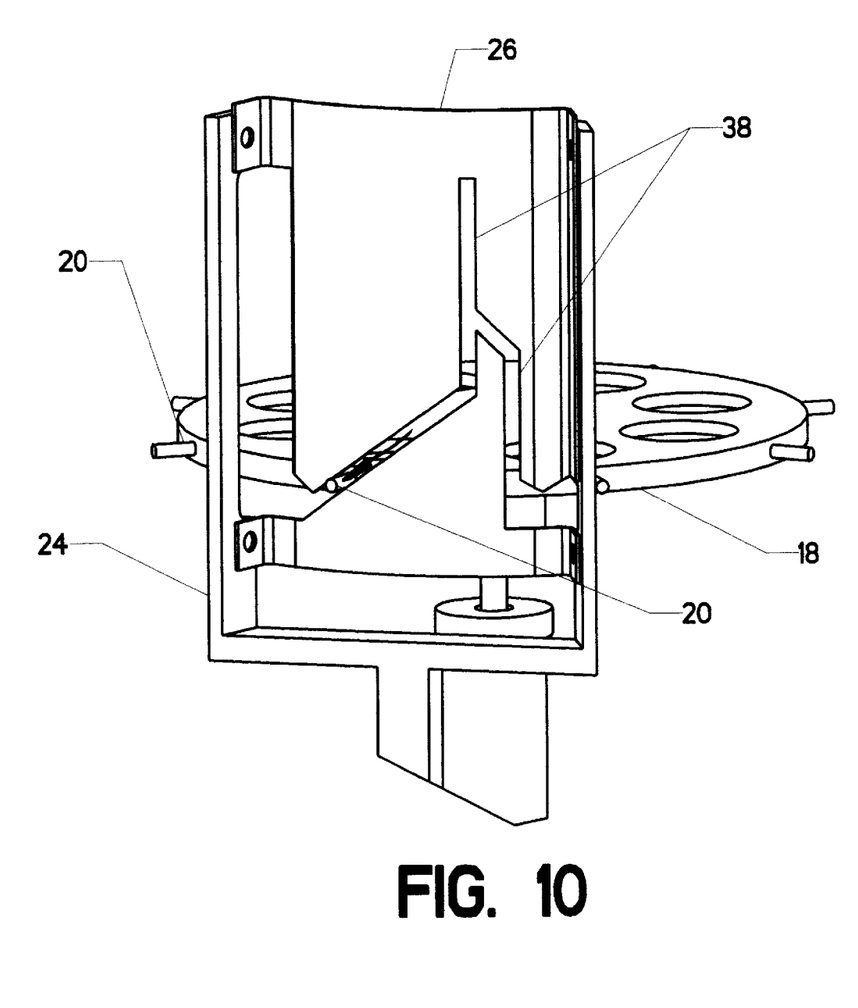
FIG. 10 is an isometric view, showing the table as it falls, and its interaction with the indexer.

FIG. 9 shows the motion as table 18 descends. The right-hand peg 20 has descended past anti-reversing joint 48 and entered second angled portion 54. The motion of table 18 at this point is downward translation accompanied by clockwise rotation. FIG. 10 shows further progress of this motion. The reader will observe that the right-hand peg 20 is approaching the position that the left-hand peg 20 occupied in FIG. 5. The reader will also observe that a new peg 20 is about to enter start point 42. Thus, the cycle is completed. Those skilled in the art will realize that by configuring slot 38 to conform to the spacing between pegs 20, the invention will continuously index via the simple raising and lowering motion of air cylinder 12.

It is important to realize why optional angled portion 36 is referred to as "optional." It is possible to design a functional version of the device which omits this element. Those skilled in the art will realize that as table 18 descends from FIG. 9 to FIG. 10, table 18 is rotating clockwise. If table 18 has any significant mass, this rotation will produce angular momentum. Such angular momentum will cause the peg 20 which is exiting slot 38 to rotate clear and the next peg 20 to rotate into position until it come to rest at the bottom of first vertical portion 50. Thus, the indexing function of optional angled portion 36 is not needed.

However, those skilled in the art will also realize that friction in the system may inhibit rotation as the device ages. Without optional angled portion 36, one cannot guarantee that the device will not reverse itself and become stuck in one indexing cycle. Accordingly, the version using optional angled portion 36 is the preferred embodiment.

Figure 11:
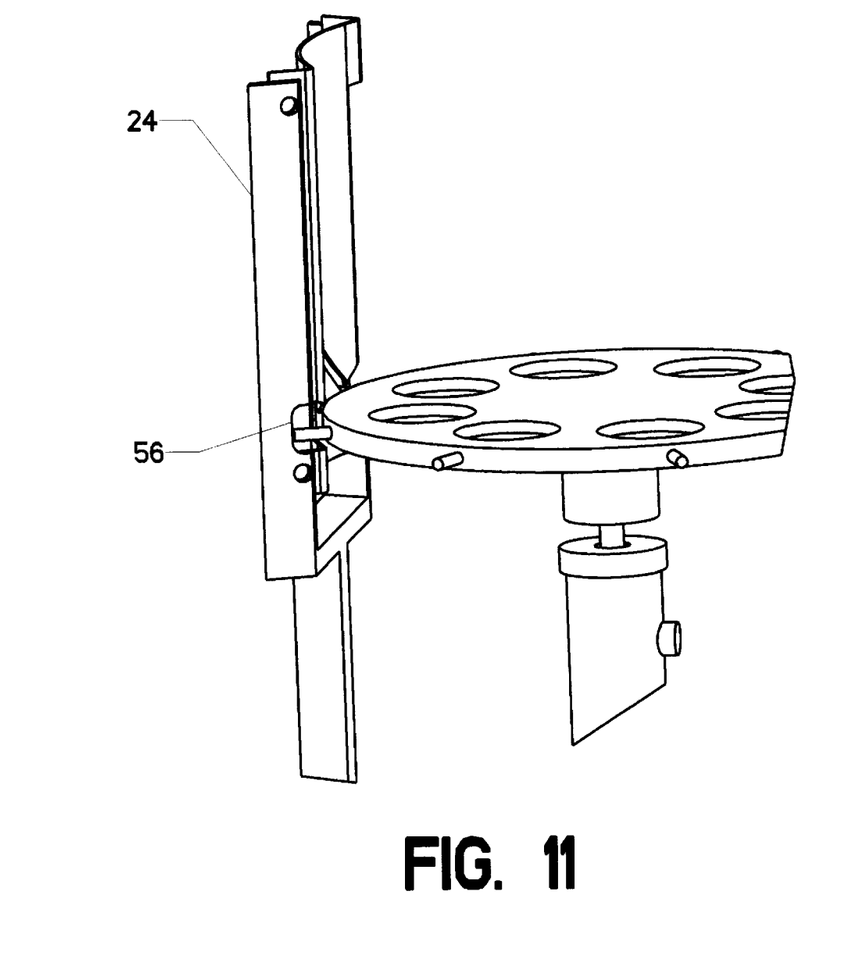
FIG. 11 is an isometric view, showing the relief cuts needed in the indexer bracket.

FIG. 11 is a detailed view showing a relief cut 56 made in indexer bracket 24. A similar cut is found in the far side of indexer bracket 24. Such relief cuts are obviously necessary to allow the free passage of pegs 20.

Having described the indexing and rotation mechanism in great detail, one might naturally wish to know about some applications for the mechanism. Accordingly, one particularly suitable application will now be disclosed. However, it is important for the reader to realize that the device has many applications in many different fields. Its consideration should not be limited to the following application.

Figure 12:
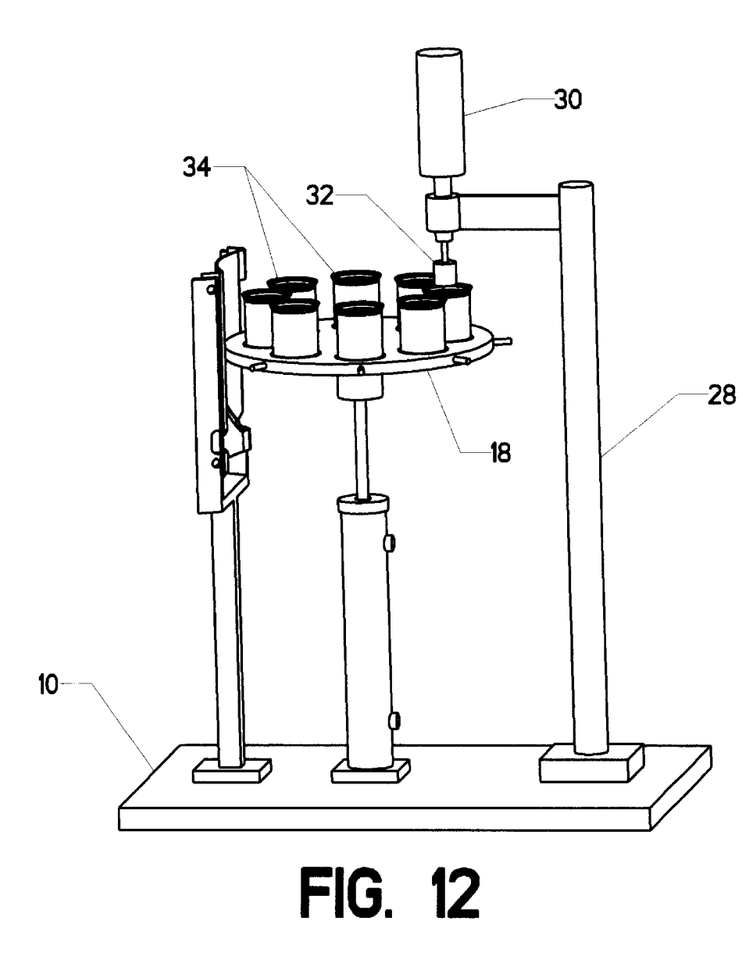
FIG. 12 is an isometric view, showing beakers in place on the table and a sample holding stand, with the table in its lowered position.

FIG. 12 depicts table 18 holding eight beakers 34. Table 18 may optionally have a polar array of recesses sized to hold beakers 34, or any other desired object. Beakers 34 typically contain liquids. Sample stand 28 is attached to base 10. It suspends sample 32 directly over one of the beakers 34. Motor 30 is provided to spin sample 32, which is helpful in some situations. FIG. 12 shows table 18 as a peg 20 has entered second vertical portion 46 of slot 38. As explained previously, the motion of table 38 at this point is a purely up and down vertical stroke.

Figure 13:
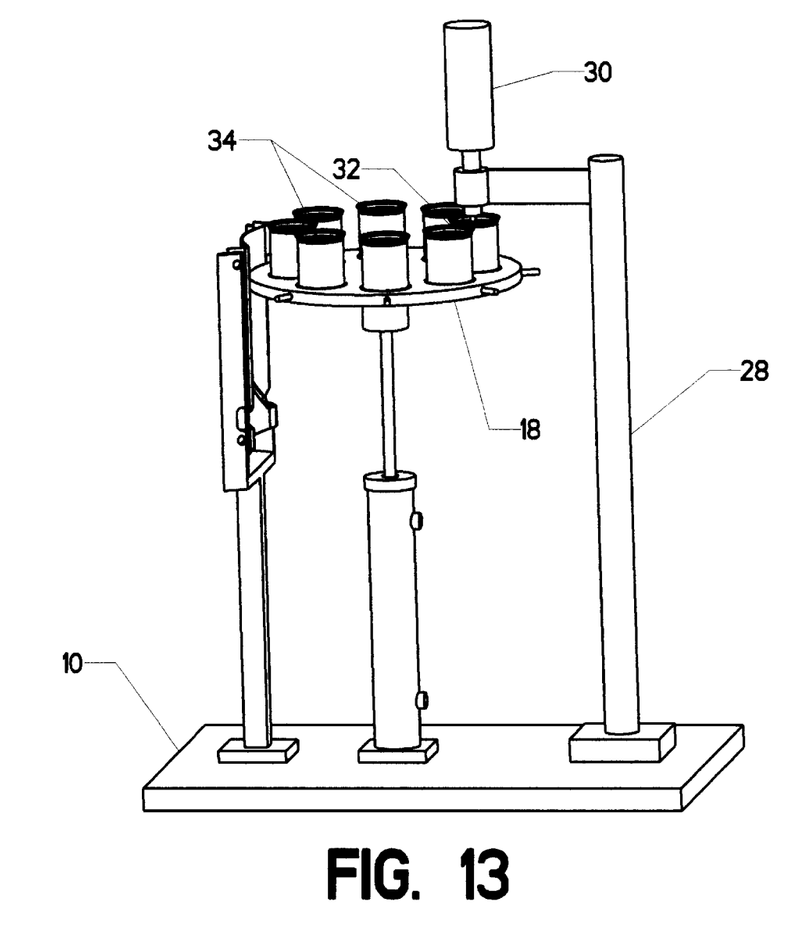
FIG. 13 is an isometric view, showing beakers in place on the table and a sample holding stand, with the table in its raised position.
Figure 14:
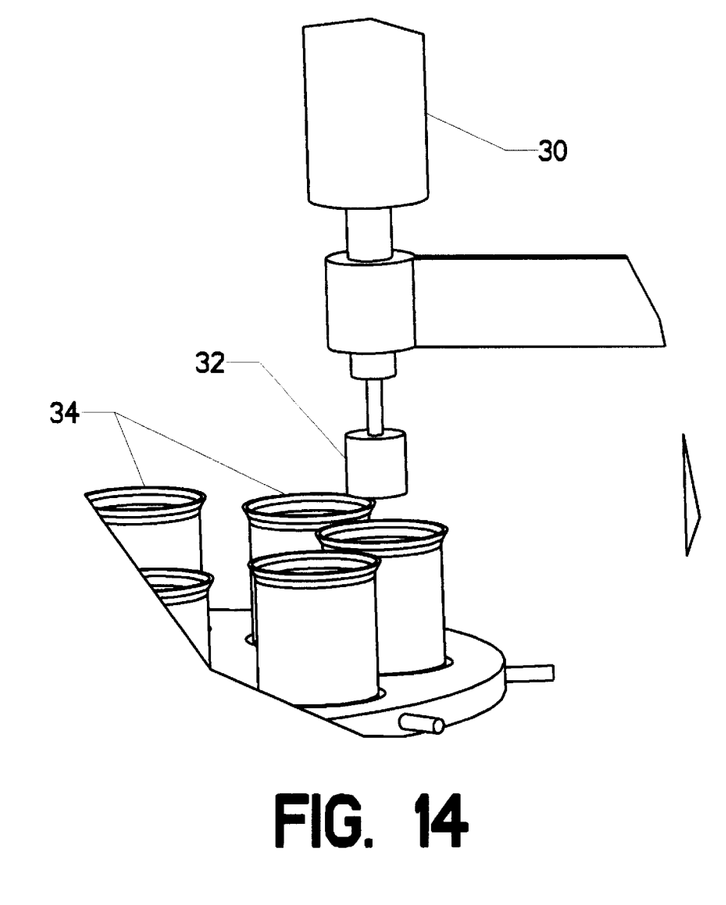
FIG. 14 is a detail view of the items shown in FIG. 12.

In FIG. 13, table 18 has moved to the upper limit of its motion. As a result, sample 32 has been immersed within the contents of the particular beaker 34. As the air pressure is removed from air cylinder 12, the particular beaker 34 will drop and sample 32 will pull free again. FIG. 14 shows a detail view of sample 32 as it has pulled free of a particular beaker 34.

The indexing motion of the device means that each successive beaker 34 will be brought directly beneath sample 32, then moved up and down to immerse sample 32 within the contents of the beaker.

As one particular example—sample 32 might be a silicon wafer. The object would be to deposit very thin layers of alternating polymers. Each successive beaker 34 would contain a polymer solution having an opposite charge (being an ionic solution) from its predecessor. As sample 32 is immersed in each successive beaker 34, the alternating layers of polymers will adhere to sample 32 and accumulate.

As another alternative, some of the beakers can contain distilled water or other cleaning solutions to purify sample 32 between successive active solutions. Virtually any type of chemical or process could be employed.

Control of the device is quite simple, as the only input needed is the air pressure to air cylinder 12. This air pressure can be controlled by a simple timer or a computer. Using a computer allows the cycle times to be varied. Thus, sample 32 could be immersed in some beakers for long periods and others for short periods.

Accordingly, the reader will appreciate that the proposed invention can readily create linear and rotary motion using only a reciprocating linear input. The invention has further advantages in that:

1. Virtually any combination of linear and rotary motion can be achieved by varying the design of slot 38;
2. It allows purely linear motion over some parts of the travel;
3. It requires only a single control input; and
4. It is quite simple.

Although the preceding description contains significant detail, it should not be construed as limiting the scope of the invention but rather as providing illustrations of the preferred embodiment of the invention. The device could be applied to many applications beyond chemical compositions, including spot welding, galvanizing processes, adhesive application, etc. Thus, the scope of the invention should be fixed by the following claims, rather than by the examples given.

Having described our invention, we claim:

1. A device for converting linear motion into a desired combination of linear and rotational motion, comprising
    a. a linear motion producing element, having a fixed lower portion, and a moveable upper portion capable of moving between a lower position and an upper position;
    b. a table, having a circular perimeter, affixed to said moveable upper portion of said linear motion producing element;
    c. a plurality of pegs, spaced evenly around said circular perimeter of said table, and radiating outward therefrom; and
    d. an indexer, having a near side and a far side, wherein said near side is positioned proximate said circular perimeter of said table, and wherein said near side opens into a slot, being sized to receive one of said pegs and being shaped to guide said one of said pegs to create said desired combination of linear and rotational motion of said table as said movable upper portion of said linear motion producing element moves from said lower position to said upper position and back to said lower position.

2. The device as recited in claim 1, wherein said linear motion producing element is an air cylinder, and wherein said moveable upper portion comprises a cylinder rod.

3. The device as recited in claim 1, wherein said linear motion producing element is a hydraulic cylinder, and wherein said moveable upper portion comprises a cylinder rod.

4. The device as recited in claim 1, wherein said slot in said indexer comprises:
    a. a first vertical portion, oriented to produce a purely linear and substantially vertical motion of said table;
    b. a first angled portion, immediately following and connected to said first vertical portion, oriented to produce a combination of linear and rotary motion of said table;
    c. a second vertical portion, immediately following and connected to said first angled portion, oriented to produce a purely linear and substantially vertical motion of said table; and
    d. a second angled portion, immediately following and connected to said second vertical portion, oriented to produce a combination of linear and rotary motion of said table.

5. The device as recited in claim 4, wherein:
    a. said first angled portion has a lower extreme and an upper extreme;
    b. said second vertical portion has a lower extreme and an upper extreme; and
    c. said upper extreme of said first angled portion is higher than said lower extreme of said second vertical portion.

6. The device as recited in claim 4, further comprising an additional angled portion immediately preceding and directly connected to said first vertical portion.

* * * * *

UNITED STATES PATENT AND TRADEMARK OFFICE
CERTIFICATE OF CORRECTION

PATENT NO.    : 6,460,424 B1
DATED         : October 8, 2002
INVENTOR(S)   : Dubas et al.

It is certified that error appears in the above-identified patent and that said Letters Patent is hereby corrected as shown below:

Column 1,
Line 3, insert:

-- The invention described herein was developed, in part, with federal research funding. --

Signed and Sealed this

Sixteenth Day of September, 2003

JAMES E. ROGAN
*Director of the United States Patent and Trademark Office*